United States Patent
Anand et al.

(12)

(10) Patent No.: US 6,401,093 B1
(45) Date of Patent: Jun. 4, 2002

(54) CROSS FILE SYSTEM CACHING AND SYNCHRONIZATION

(75) Inventors: Vaijayanthmala K. Anand; Steven Michael French; Thomas Frank Peebles, all of Austin; John I. Spencer, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,634

(22) Filed: Mar. 31, 1999

(51) Int. Cl.[7] .............................................. G06F 17/30
(52) U.S. Cl. ........................................ 707/10; 707/203
(58) Field of Search ......................... 707/10, 205, 202, 707/201, 102, 200, 203, 204; 709/222; 713/2; 711/4, 113, 124, 125

(56) References Cited

U.S. PATENT DOCUMENTS

| | | | |
|---|---|---|---|
| 5,371,885 A | 12/1994 | Letwin | 707/205 |
| 5,444,850 A | 8/1995 | Chang | 709/222 |
| 5,666,532 A | 9/1997 | Saks et al. | 707/205 |
| 5,680,547 A | 10/1997 | Chang | 709/222 |
| 5,742,819 A | 4/1998 | Caccavale | 707/200 |
| 5,745,750 A | 4/1998 | Porcaro | 707/102 |
| 5,774,717 A | 6/1998 | Porcaro | 707/202 |
| 5,832,518 A | 11/1998 | Mastors | 707/202 |
| 6,138,234 A | * 10/2000 | Lee et al. | 713/2 |
| 6,151,674 A | * 11/2000 | Takatani | 713/2 |

* cited by examiner

*Primary Examiner*—Sanjiv Shah
(74) *Attorney, Agent, or Firm*—Duke W. Yee; Jeffrey S. LaBaw; Christopher P. O'Hagan

(57) ABSTRACT

A method for file synchronization during an operating system boot sequence between a client and a server. Upon initiation of the boot sequence, a mini file system driver is downloaded to the client. The mini file system driver is used to download the full operating system kernel. During a first phase of the boot sequence, file data and information for managing the file data generated by a first file system driver is cached. Upon initialization of the operating system, i.e. during a subsequent phase of the boot sequence, a second file system inherits the file data and information from the first file system driver. The second file system unloads the first file system driver and updates the data files.

21 Claims, 4 Drawing Sheets

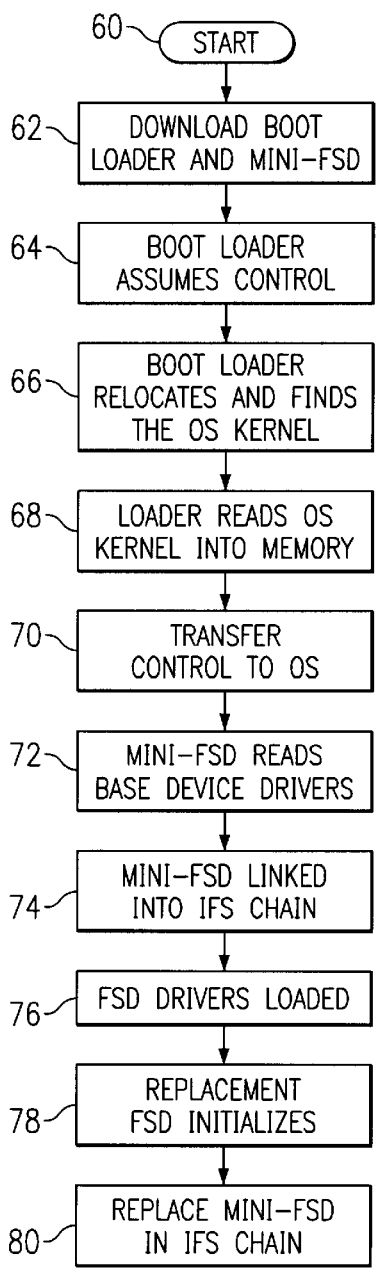
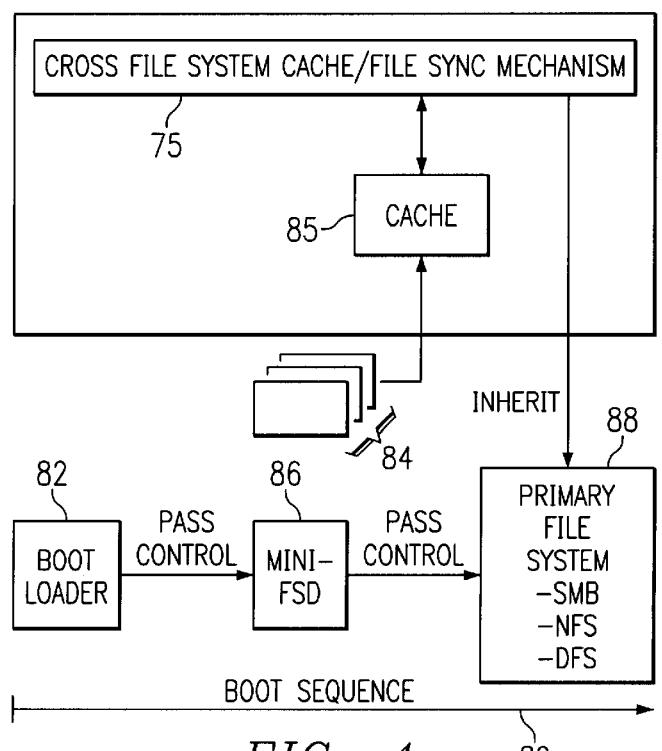
FIG. 3
(PRIOR ART)
FIG. 4

CROSS FILE SYSTEM CACHING AND SYNCHRONIZATION

BACKGROUND OF THE INVENTION

1. Technical Field

The present invention relates generally to file management during initialization of a computer in a distributed computing environment.

2. Description of the Related Art

A common distributed computer environment comprises a plurality of clients connected to one or more servers. Each client may be a diskless or so-called "thin" network computer that is designed to receive a download of an operating system kernel upon initiation of a boot sequence. As the client machine initializes, its BIOS makes a request for a boot sector. Depending on the hardware installed, the request is intercepted by code (e.g., DHCP/PXE or RIPL) on a network adapter, which then downloads a boot loader and a mini file system driver (or "mini-FSD"). The mini-FSD is a small network file system driver that consumes very few system resources. It is used to manage file requests (e.g., read, open, close, etc.) during the boot sequence. Once downloaded, the boot loader takes over the boot sequence, using the mini-FSD for support, until the operating system kernel is fully loaded. When the kernel has loaded, the mini-FSD is no longer used as the client then has full access to the network file system.

Typically, the boot loader uses a simple protocol (e.g., TFTP) to control the mini-FSD. During the initial boot phase, the mini-FSD must honor requests to open, read, and close files and/or devices that are actually being managed by an efficient, powerful server file system (e.g., NTFS or HPFS396). Theoretically, the network mini-FSD could issue direct requests to the server's network file system using high performance traditional network file system protocols (such as SMB/CIFS, NFS, DFS or proprietary LAN protocols) provided by the server. In practice, however, it is very expensive to do so in terms of memory, time, and protocol support. Furthermore, the network adapter support services (e.g., the preboot extensions built into most current x86 motherboards) do not coexist well with the operating system that is attempting to initialize due to interrupt conflicts, DMA conflicts, and the like. Therefore, in this example, using the native protocol of the server has many disadvantages. Moreover, use of TFTP alone does not solve the problem either, and its performance is unacceptable. Primarily, this is because the network adapter has a primitive set of services, and these services compete for resources as control is being transferred to the full file system. This competition creates instabilities.

Thus, there is a need to provide a mechanism for honoring file system requests during the boot sequence that overcomes these and other deficiencies of the prior art.

BRIEF SUMMARY OF THE INVENTION

It is an object of the present invention to provide a mechanism by which a first file system does certain work for a second file system, and this work is then inherited by the second file system. In a preferred embodiment, the first file system is a mini file system driver and the second file system is a file system driver.

Another object of the present invention is to enable files to be left open across a pair of file systems so that a second file system can take over for a first file system as if the second system had been managing the files.

It is a more specific object of this invention to enable a mini file system driver (mini-FSD) to perform given file operations during a boot sequence and have a network file system inherit information about those operations as the boot sequence is completed.

A still further object of the invention is to provide a cross file system caching and file synchronization mechanism for a boot service.

A more general object of this invention is to provide given file operations that are managed across a pair of file systems.

Still another general object is to provide an inter-file system mechanism for honoring file system requests during a network computer boot sequence.

According to the present invention, during a boot sequence (or upon restart of the computer following a partial network failure), a file system driver (e.g., a mini-FSD) caches files that are needed prior to the time at which a primary file system (e.g., a network file system) is operational. The file data is cached, together with information needed to manage these files, as the first file system driver operates during an initial portion of the boot sequence. Later in the sequence, when the primary file system is operational, it inherits the file information from the file system driver. Thereafter, the primary file system synchronizes the updated files.

Thus, during the boot process, files necessary to boot a client machine are loaded and cached. The file system driver inherits these cached files and performs given file operations on them. Thus, for example, on a file open, the file system driver first searches for a path/filename in the cached files. If the file is not cached, the file system driver returns a "file not found" error. If the file is found, the driver checks for other error conditions (sharing violations, permissions, or the like) based on the information stored with each cached file. If no errors are detected, the file system driver stores the open information and returns a success indication.

When the primary file system initializes, it "inherits" the file information from the first file system. The primary file system then synchronizes the file updates.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a simplified flowchart of a known boot sequence in which a network file system driver (the mini-FSD) is downloaded to the client machine;

FIG. 4 is a simplified block diagram of the operating sequence of the present invention involving a boot loader, the mini-FSD, and the network file system;

DETAILED DESCRIPTION OF THE PREFERRED EMBODIMENT

Figure 1:
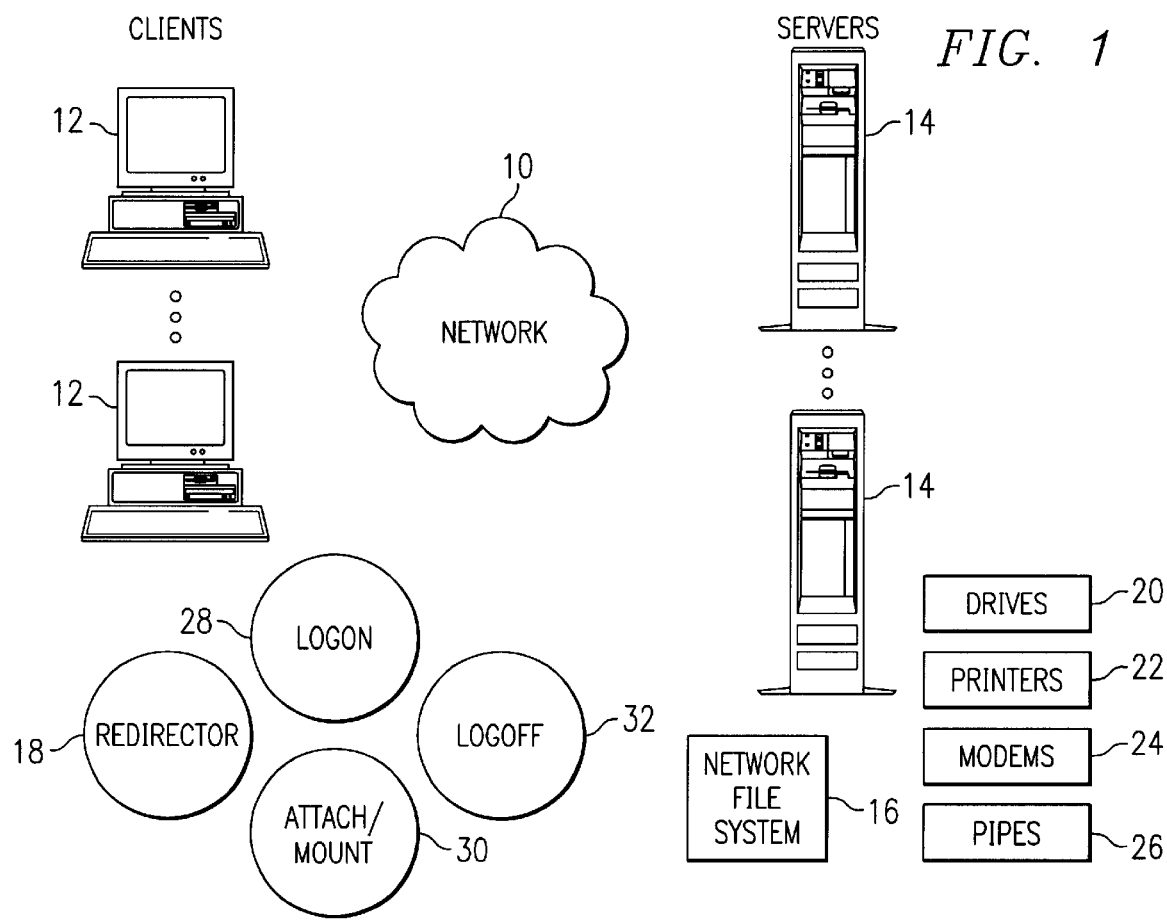
FIG. 1 is a simplified block diagram of a client-server network in which the present invention is implemented.

The present invention is implemented in a computer network 10 such as illustrated in FIG. 1. In this network, a plurality of clients 12 are connected to one or more servers 14. Each client is a personal computer or a diskless network computer. A given server preferably supports an operating system, such IBM® OS/2® Warp™ Server. Version 4.0. As is well-know, OS/2 Warp Server provides an application server foundation with integrated file and print sharing, backup and recovery services, remote business connections systems management, advanced printing, and Intenet access. A given client machine has a processor that executes an operating system and various application programs. A representative client machine is a personal computer that is x86-, PowerPC®-, 68000- or RISC-based, that includes an operating system such as IBM™ OS/2® Warp™ Client Version 4.0. Although the above operating systems are preferred, the present invention may be implemented on any network clients, including DOS, Windows 3.x, Windows NT Workstation, Windows for Workgroups, Windows '95, Windows '98 and Windows 2000.

As illustrated in FIG. 1, the client-server network includes a network file system 16, e.g., an SMB (CIFS) file system. Other network file system types include NFS (for UNIX) and the like. As is well-known, a network client typically has support for a redirector 18, which is software that allows a user at the client to access various network devices located on servers in the network. Typically, such devices are of four (4) distinct types: file directories or drives 20, printers 22, modem/serial ports 24, and interprocess communication ("IPC") mechanisms such as named pipes 26. A user normally attaches to or mounts a given network device after he or she logons to the network through the logon process 28. Although the technique by which a network device is mounted is implementation-specific, typically this function is accomplished using a network device attachment/mount process 30. The attachment process, among other things, attaches the user to the network device by issuing to the server certain connection requests. Conversely, the user normally detaches from a connected network device upon logoff, or upon logon as a different user. A logoff process 32 is used to demount network devices, typically by issuing to the redirector 18 certain disconnection requests.

Figure 2:
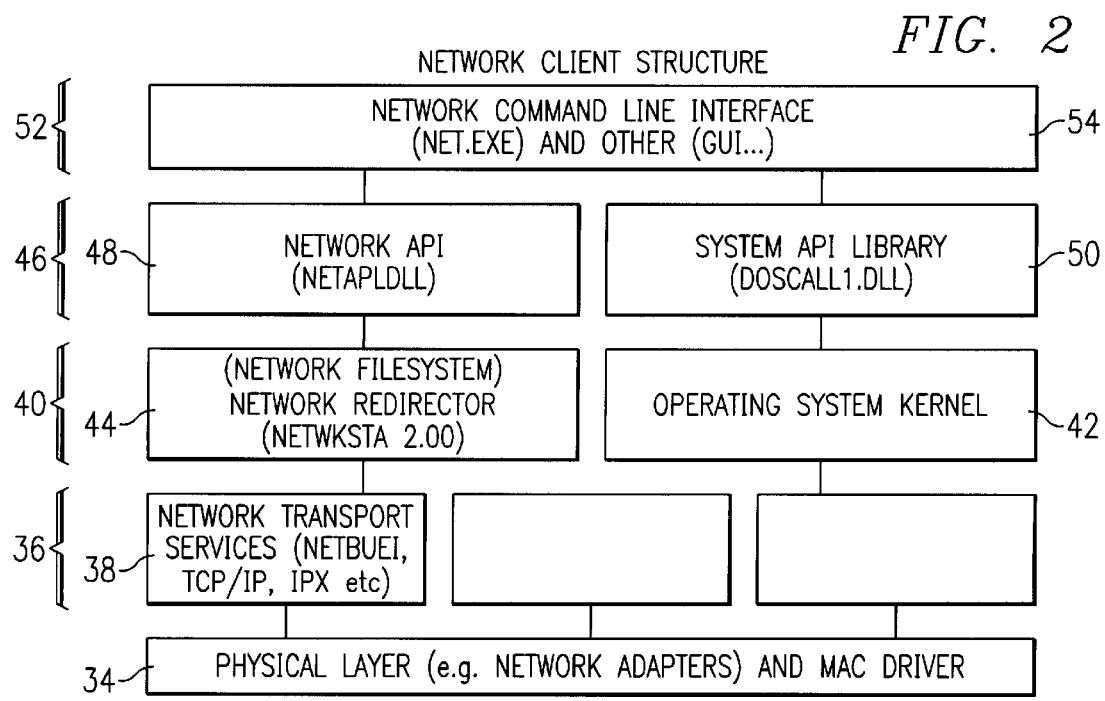
FIG. 2 is a block diagram of a network client structure that supports a network redirector and the inter-file system mechanism of the present invention.

FIG. 2 illustrates a known network (e.g., an SMB (CIFS)) client structure. This structure conforms to a conventional layered network operating system architecture. The bottom layer of the stack is the physical layer 34, comprising network adapters and MAC drivers. Moving upwards, the next layer 36 provides network transport services 38 (e.g., NETBEUI, TCP/IP, IPX, and the like). The next layer 40 includes the operating system kernel 42 together with the network redirector 44 (in this case, SMB/CIFS File System redirector (NETWKSTA.200)). The next layer 46 supports a network application programming interface (API) 48 (in this case, NETAPI.DLL) and the system API library 50 (in this case, DOSCALL1.DLL). The highest layer 52 is the network command line interface 54 (in this case, NET.EXE or some other graphical user interface).

FIG. 3 is a simplified flowchart of a known boot sequence in which a network file system driver (the mini-FSD) is downloaded to the client machine. For greater efficiencies during operating system initialization, most modern operating systems have a special file system driver used during bootup of the operating system. This file system driver is often called a "mini-filesystem" or "mini-FSD" because it is smaller (in size on disk and smaller in memory utilization) and also because it supports a very limited subset of file system operations. The mini-FSD in some operating systems is part of the operating system kernel file rather than being a distinct module. A typical mini-FSD has the following two characteristics:

a) it can function before base device drivers (e.g., keyboard, mouse, print and video drivers) are loaded;

b) it supports a much smaller set of entry points than a standard filesystem (such as HPFS, FAT, FAT32, NFTS or JFS) e.g., open a file, read a file, seek to a new location in a file ("change file pointer"), close a file, terminate (unload and free the mini-file system from memory).

In OS/2, for example, these respective entry points are named as: MFS_OPEN, MFS_READ, MFS_CHGFILEPTR, MFS_CLOSE, and MFS_TERM. Other file system operations, such as locking files, writing to files, changing file size, listing directory contents, changing file attributes and the like, are not normally implemented (or are implemented as stub functions) by mini-FSDs, although, as will be seen, the present invention makes it easier to implement such functions by allowing a mini-FSD to cache file and directory updates for the full function file system driver (FSD) to write out later in the boot sequence. The nomenclature "mini-FSD" used herein is not intended to define any vendor-specific code or routine. The mini-file system driver is sometimes also referred to as a file system recognizer.

By way of additional background, the client's operating system and file system drivers (or mini-FSDs) contain state information. For example, in a network computer, the mini-FSD contains a list of open files and their corresponding file identifiers ("file handles") and the server from which the file was loaded. In most network file systems, the network server also maintains state about the client (e.g., the list of server files opened on behalf of that client). Some of the simpler network file system protocols of the prior art did allow for stateless servers, e.g., early versions of the NFS file server were stateless ("idempotent") although the corresponding network client usually maintained some state.

Network file system drivers (redirectors) typically maintain more state than simple mini-FSDs. Network file system drivers sometimes cache network file data in the clients RAM or on the client's local disk drive by "reading ahead" (requesting more file data from the server than was needed) or "writing behind" (delaying writes to the server until the file is closed). It is important that the state of the files on the client (e.g., file updates, file deletions, locks on files or locks on ranges of a file) eventually be updated on the server so that the server's state for a shared file or directory reflects both the local and remote changes to that file or directory.

Returning to FIG. 3, the routine begins at step 60 in response to a boot request. At step 62, the boot loader (OS2LDR) and mini-FSD are downloaded from a boot server to the client machine. The boot routine then continues at step 64 with the boot loader assuming control of the boot process. When the boot loader receives control, it must be passed information about the current state of memory and pointers to the open, read, close and terminate entry points of the operating system. At step 66, the boot loader relocates itself to the top of low memory and, with the help of the mini-FSD, scans the root directory for the network location of the operating system kernel file (OS2KRNL). At step 68, the loader reads the OS kernel into memory and, at step 70, transfers control to the kernel. When the kernel receives control, the routine continues at step 72 with the mini-FSD called to read the base device drivers. At step 74, the mini-FSD is linked into an IFS chain and asked to initialize. At step 76, the device drivers and the network file system drivers (FSD) are loaded. The first FSD loaded typically replaces the mini-FSD. After the replacement FSD has been loaded, the routine continues at step 78. At this point, the replacement FSD is called to initialize itself and take whatever action is [needs] needed to effect a smooth transition from the mini-FSD to the FSD. At step 80, it then replaces the mini-FSD in the IFS chain, as well as in any kernel data structures that keep a handle to the FSD. This completes the process.

The mini-FSD is typically built as a dynamic link library. It registers with an I/O manager as a file system driver so that the mini-FSD gets invoked whenever an I/O request is received that is targeted to a physical device on which no mount operation has been performed. Upon receiving a mount request for a physical or virtual device, the mini-FSD queries the device (i.e. by performing I/O operations) to determine whether the devices contains a valid logical volume.

Referring now to FIG. 4, a simplified block diagram is shown of the cross file system caching and file synchronization mechanism 75 of the present invention. The mechanism 75 has a cache 85 associated therewith. In one embodiment, the mechanism comprises part of the mini-FSD. Alternatively, the functions described below are implemented in standalone code. According to the invention, during a boot sequence (or upon restart following a partial network failure), a boot loader 82 initially loads certain files 84 before any hardware conflicts can arise. Files 84 are also cached in cache 85, together with information about how to manage those files. As the mini-FSD 86 is initialized, it inherits the cached files under the control of the cross file system caching and file synchronization mechanism 75. The mechanism 75 then controls the mini-FSD 86 to perform any necessary file operations that are required during this phase of the boot process. As will be seen below, the mini-FSD 86 thus may update the files that it inherited from the boot loader operation. When the primary network file system 88 (or a given driver thereof) is initialized, the mechanism 75 directs the system 88 to inherit the updated file information from the mini-FSD. FIG. 4 also illustrates a timeline 89 showing when the mini-FSD and the file system operate during the boot sequence. As will be described, the primary network file system is then directed to synchronize the updated files. This completes the process.

Thus, during the boot process, files necessary to boot the client machine are loaded and cached. The mini-FSD inherits these cached files and performs given file operations on them. These files are then inherited by the primary file system driver.

Figure 5:
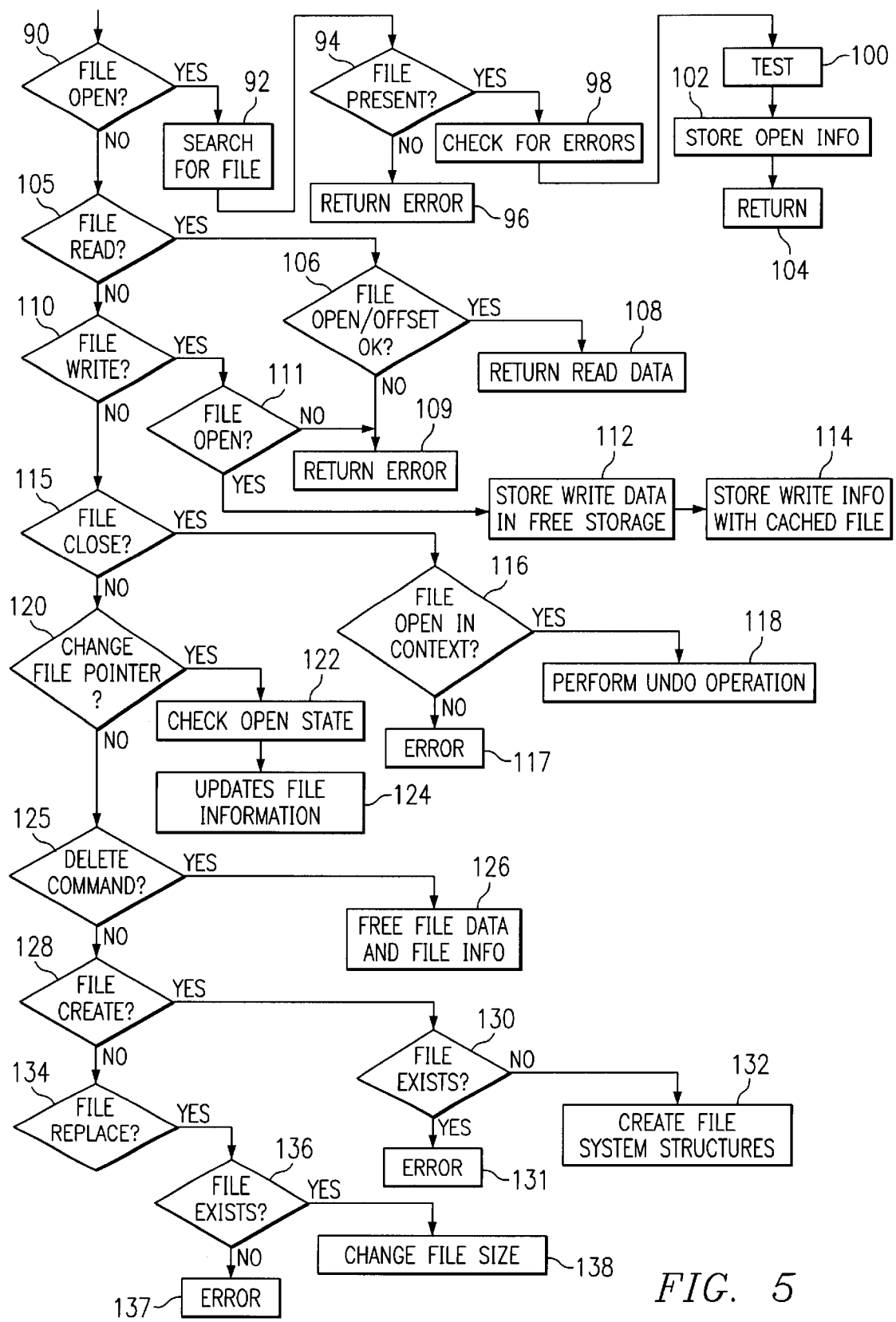
FIG. 5 is a flowchart illustrating the various file operations that may be performed by the mini-FSD component of the present invention.

FIG. 5 is a flowchart illustrating the various file operations that may be performed by the cross file system caching and file synchronization mechanism of the present invention. The sequence is arbitrary, and other sequences and steps may be implemented. The routine begins at step 90 to determine whether a file open operation is required. If so, the file system driver searches for a path/filename in the cached files. This is step 92. At step 94, a test is done to determine if the path/filename exists. If not, the file is not cached, and the file system driver returns a "file not found" error at step 96. If the file is found, the routine continues at step 98 with the driver checking for other error conditions (sharing violations, permissions, or the like) based on the information stored with each cached file. The driver then tests for errors at step 100. If no errors are detected the file system driver stores the open information at step 102. It then returns a success indication at step 104.

If the outcome of the test at step 90 is negative, the mechanism 75 then tests to determine whether a file read operation is requested. This is step 105. If so, control branches to step 106. At this point, the file system driver ensures that the file is open in the correct process context and that the read offset and size are acceptable. If so, at step 108, the driver then returns the read data from cache. If not, an error is returned at step 109.

If the outcome of the test at step 105 is negative, the mechanism then tests to determine whether a file write operation is requested. This is step 110. At this point, a test is done at step 111 to ensure that the file is open in the correct process context. If not, an error is returned. If so, the driver stores the write data in free storage at step 112. Thereafter, at step 114, the driver stores the write information with the cached file.

If the outcome of the test at step 110 is negative, the mechanism tests to determine whether a file close operation is requested. This is step 115. If so, control continues at step 116. At this point, the driver ensures that the file is open in the correct process context. If not, an error is returned at step 117. If so, the driver performs an undo operation on the corresponding open at step 118.

If the outcome of the test at step 115 is negative, the inventive routine tests to determine whether a "change file pointer" operation is requested. This is step 120. If so, control continues at step 122. At this step, the file system driver checks the open state and then, at step 124, updates the file information.

If the outcome of the test at step 120 is negative, the inventive routine tests to determine whether a delete command has been received. This is step 125. If so, the file system driver frees the file data and file information at step 126.

If the outcome of the test at step 125 is negative, the routine tests for a file create command. This is step 128. If the outcome of the test is positive, the file system driver checks at step 130 to see if the file exists. If yes, an error is returned at step 131. If not, at step 132, the driver creates appropriate file information structures and performs whatever other operations that may be required by the operating system (e.g., zeroing all file data).

If the outcome of the test at step 128 is negative, the routine tests to determine whether a file replace has been requested. This is step 134. If so, the file system driver checks at step 136 to see if the file exists. If not, an error is returned at step 137. If so, at step 138, the driver then changes the file size as identified in the file's information structures and optionally overwrites the file contents. This completes the processing.

Figure 6:
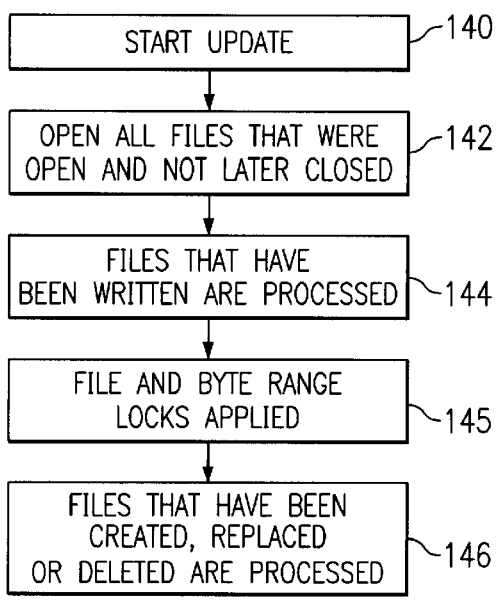
FIG. 6 is a flowchart illustrating how the primary file system synchronizes the file updates provided by the mini-FSD.

As noted above, when the primary file system initializes, it "inherits" the file information from the mini-FSD. The primary file system then synchronizes the file updates as now described in the flowchart of FIG. 6.

The routine begins at step 140. At this step, the primary file system needs to open all the files that were opened and not later closed. These files (which the operating system considers open and that exist on the network server) are then opened via a network protocol. This is step 142. On the other hand, any of these files that have been written by the mini-FSD methods described above (and which exist on the network server) are then opened (if necessary), written, and closed (if necessary). This is step 144, which is carried out using an appropriate network protocol. File and byte range locks are then applied at step 145. At step 146, any files that were created, replaced, or deleted by the mini-FSD methods as described above are created, replaced or deleted (as the case may be) either locally or via the appropriate network protocol. This completes the update process.

Thus, according to the present invention, as the mini-FSD is called during the boot process, given data is cached. This data includes, for example, write requests to the bootlog, read data, write data, lock data, unlock data, and the like. Simple protocols (e.g., TFTP) cannot support these advanced file system semantics. The present invention overcomes this deficiency by caching such data and then enabling the full network file system (e.g., SMB, DFS, NFS, or the like) inherit that data. Thus, later in the boot sequence, when the full file system is initialized (and the sequence is substantially complete), the cached data is passed to the primary system. As previously described, the full file system also turns off the mini-FSD, e.g., by calling a routine that unloads the mini driver from system memory.

Figure 7:
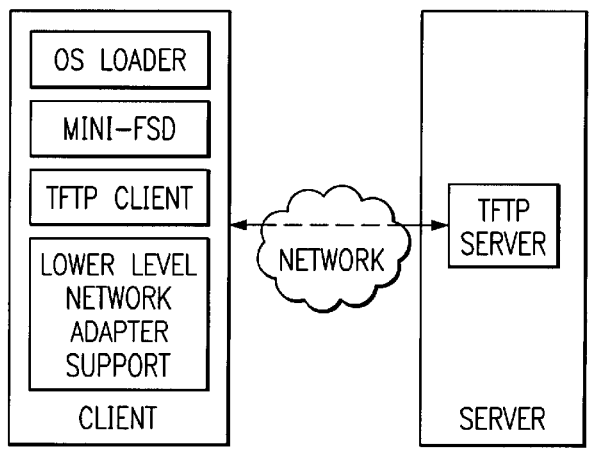
FIG. 7 is a block diagram illustrating a network computer connected to a boot server during an initial phase of the boot sequence.
Figure 8:
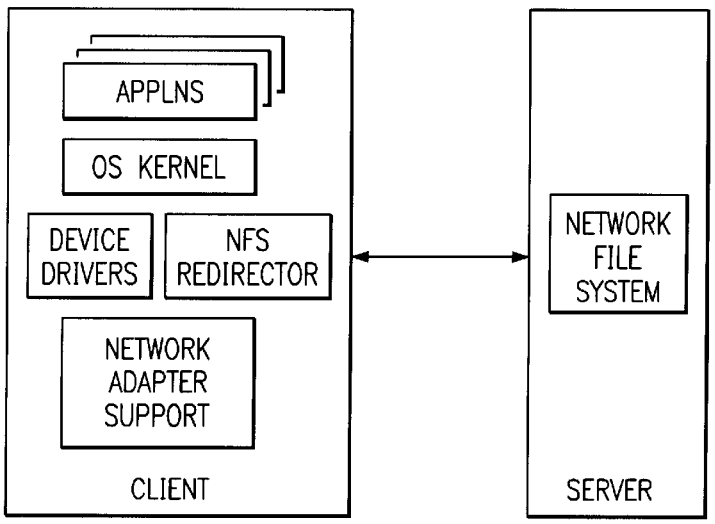
FIG. 8 is a block diagram illustrating the network computer components during a latter phase of the boot sequence begun in FIG. 7.

FIG. 7 is a block diagram illustrating a network computer connected to a boot server during the initial phase of the boot sequence. In this figure, the boot loader and the mini-FSD are illustrated in conjunction with a network transport service layer (e.g., a TFTP client) that connects to the TFTP server layer in the boot server. FIG. 8 is a block diagram illustrating the network computer components during the latter phase of the boot sequence. In this phase, the network file system redirector (e.g., NETWKSTA device driver) connects to the full network server. As noted above, when the full network file system initializes, the mini-FSD is unloaded (and therefore is not illustrated in FIG. 8), and given information is inherited by the full network file system to enable that file system to re-open files and to manage the updates made by the mini-FSD during the initial portion of the boot sequence.

The present invention provides several advantages over the prior art. As noted above, the boot loader loads the files necessary to boot the client up to the time at which the primary network file system driver is operational. The network mini-FSD "inherits" the cached files. It performs the file operations as described above, and then the primary network file system driver "inherits" the updated file information. It then synchronizes the updated files.

In accordance with the present invention, the state of the files is synchronized with the network file system. Thus, the operating system can leave files open, and the primary file system can open, but not close, these files, using the server's main protocol (which is more suitable for network file server operations than TFTP). In this way, the primary file system can "take over" as the network file system for the client machine, and the server can operate as if the primary file system had been managing the files all along during the caching phase.

As previously described, the inventive cross file caching and file synchronization mechanism preferably is implemented in software downloadable to the client machine. The inventive functionality is preferably implemented within or as an adjunct to a network redirector module of a network operating system. The given functions described above thus may be implemented as a set of instructions (program code) in a code module resident in the random access memory of the computer. Until executed by the computer's processor, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, the term "server" should also be broadly construed to mean a computer, computer platform, an adjunct to a computer or platform, or any component thereof of course, a "client" should be broadly construed to mean one who requests or gets the file, and "server" is the entity which transmits the file.

A more detailed specification of the cross file caching and file synchronization mechanism (NETWKSTA.200) of this invention is set forth below: Design for OS/2 Network PC MiniFSD:

The following section describes memory headers, which the invention uses to store information needed before the "lazy" updates are performed.

Network PC Mini-FSD assumes that all the file information and data for the files that will be read during the MiniFSD's lifetime will be in memory before the MiniFSD starts. Each file in memory has a corresponding memory header, which is briefly described below. The actual memory header structure is in ripl\h\ripltyps.h, and the name of the structure is FileDirEnt. If a file is in memory, Mini-FSD copies the read data from memory. If the OS kernel attempts to open a file which is not in memory, Mini-FSD fails the FS_OPENCREATE request.

The following section describes inheritance: how the main file system inherits file information, including structures, from the Mini-FSD.

This item is a natural consequence of the previous item, namely, the fact that NetPC Mini-FSD preferably does not use SMB sessions. Netwksta.200 needs to be able to "inherit" unclosed files for which the mini-FSD has received no MFS_CLOSE command (e.g. NETWKSTA.200, DOSCALL1.DLL, LT0.MSG). It must set up connections to the server and related control blocks for the unclosed files. The Mini-FSD will create a SRV_LIST containing the server name, but will leave many of the SRV_LIST structure fields uninitialized. It will create a CON_LIST structure for each server share in which any of the files that it opens resides, but again, it will not be able to fill in all the fields. Also, it creates an RSFT (Redirector System File Table Entry) structure and points it to the file name in the MiniFSD heap memory, but leaves fields uninitialized. The redirector initializes these fields later (e. g. the server protocol in SRV_LIST, the tree id in CON_LIST, the network file handle in the RSFTs.)

The pointer to ripl data points to a different structure from the one ripl uses. See MFS_INIT below.

It is desired to support both BOOTP (local files in memory for micro/mini-FSD) and also the old RIPL (mini/ microFSD use 802.2, Netbios, SMBs), NETWKSTA.200 needs to know which kind of RIPL is running. The NETPC Mini-FSD will adopt a new version number in the mfsd_ parms structure in STRUCT.INC to identify itself to NETWKSTA.

Network PC Mini-FSD need not allocate all the memory structures (e.g., SMB) which the RIPL MiniFSD does.

The client .FIT (a File Index Table, used for remapping file names) data is a FILE in memory, whereas in RIPL it is at the end of the BootDataMfs structure.

Network PC Mini-FSD does not search the FIT data to construct UNC names; instead, it constructs UNC names from the \\SERVNAME\RPLFILES string and the path in the file header. See FS_OPENCREATE below.

Network PC Mini-FSD uses a new MFSH_file helper routine, MFSH_SYSCTL, to obtain a DEVHELP address.

FS_CHGFILEPTR emulates the server function in calculating a new file pointer from the type of operation requested (from beginning, from end, from current)

The following section describes the structures used to store information needed before the "lazy" updates are performed.

File Headers in Memory (FileDirEnt struct in ripltyps.h) contain: file name (share info), file size, and physical address of file data.

MFS_INIT routine:

Copies the address of the DevHlp routine to the Mini-FSD data segment, and uses DevHlp_GetDOSVar to get a flat data selector. Find the address of the client FIT file data, once and for all, and store it. Get the server name from the start of the FIT and construct a \\SERVNAME\RPLFILES string at the label rplshare. FS_OPENCREATE will use this later to construct UNC names. Get vars from RPL.MAP and store them. One of the arguments to MFS_INIT is a pointer that is named mfi_bootdata in mfsd.asm. This points to the BootDataMfs structure (see ripltyps.h). Save the DevHelp address, address of the start of the file headers, and the address of the RPL.MAP line from this structure. Parse the RPL.MAP line, get the boot drive letter, and call MFSH_SETBOOTDRIVE to give the boot drive letter to OS/2. Allocate memory for SRV_LIST, RSFT, etc. structures. Allocate one SRV_LIST structure for the server that is sharing the RPLFILES and WRKFILES shares. Copy the server name from the FIT info to the SRV_LIST structure. Another important argument is mfi_minifsd. MFS_INIT fills in a structure mapped by the mfsd_parm struc in STRUCT.INC, which is located at label mfsd_to_redir_parms in the MiniFSD's data structure. This structure contains a pointer to the FIT table, pointers to RSFTs, the SRV_LIST chain, the heap, etc. MFS_INIT sticks a pointer to this mfsd_parm structure in the dword pointed to by mfi_minifsd. Later, NETWKSTA.200's FS_INIT routine receives this pointer in its arguments and stores its callback address in the mfsd_callback field.

MFS_OPEN routine:

This is almost identical to the MFS_OPEN logic in the RIPL MiniFSD, except for some OS/2 2.0+ and Intel 386 changes. MFS_OPEN calls FS_OPENCREATE to do the work.

MFS_READ,MFS_CHGFILEPTR,MFS_CLOSE routines:

These are identical to the MFS_* logic in the RIPL MiniFSD. The MFS_* calls its corresponding FS_* to do the real work.

The following section describes the inheritance mechanism, MFS_TERM, which means "Mini FileSystem Termination", i.e. the minifsd terminates and the main filesystem takes over.

MFS_TERM routine:

Calls OEM_TERM1 and OEM_TERM2 (optional supplementary termination routines).

Calls FixRModeINTs to reset the real mode interrupt 1C to something safe.

Calls the NETWKSTA.200 callback routine. It finds the address of this routine in the mfsd_parm structure. This is the sequence of events: 1) Mini-FSD's MFS_INIT routine stores info in mfsd_parm structure; 2) NETWKSTA.200's FS_INIT routine copies the mfsd_parm info to its data segment, and stores its callback address (hy_FS_INIT_RIPL) in the mfsd callback field of the mfsd_parm structure; and 3) Mini-FSD's MFS_TERM routine calls the address in the mfsd_callback field. At this time, Mini-FSD does not receive another MFS_ or FS_ command. The NETWKSTA callback routine does what it needs to do to "inherit" the structures bequeathed by MiniFSD.

It also calls devhelp FREEPHYS to free The 2MEG+ chunk of memory that the file data is stored in.

Calls FixRModeMem to reset the memory settings to standard settings.

FS_FSCTL routine:

The RIPL MiniFSD assumes that there was only one valid FS_FSCTL, which would hang up the Netbios session to the server. The NetPC MiniFSD has no Netbios sessions, and simply sets ax=0 and returns.

The following section describes how the minifsd saves the OPEN FILE information so that later, "lazy" file operations can execute.

FS_OPENCREATE routine:

Calls FindFile to find the file header that the bootstrap created. If not found, the open fails.

Sets OPEN ACTION to "FILE EXISTED."

Copies the file size from the file header to the SFT.

Copies the file mode from the input argument foc_lattr to the SFT.

Sets the SFT file pointer to 0.

Builds the UNC name by appending the \\SERVNAME\RPLFILES+the FTP path string from the file header.

Saves the pointer to the file header in the filesys dependent area. FS_READ will be able to get to the file header later without searching.

Creates a corresponding CON_LIST structure if one does not exists already.

Allocates an RSFT structure via a call to AllocRSFT, which allocates the memory, links the structure in the _RSFT_head chain, stores the RSFT pointer in the filesys dependent area of the SFT, allocates heap memory for the UNC name, copies the UNC name into the heap memory, stores the pointer to the name in the RSFT, and links the CON_LIST to the RSFT.

FS_READ routine:

Gets the file header pointer from the filesys dependent part of the SFT (System File Table Entry), gets the physical address of the start of the file data from the header, adds the file pointer, calculates how much of the requested read length is actually in the file, maps the starting read address (physical) to a GDT, and calls _NetRead to copy the data into the user buffer.

In addition, FS_READ checks for file headers that have no data pointer. This condition would occur if FS_OPENCREATE ever "created" a file because it could not find the file header. The current design of FS_OPENCREATE does not allow files to be "created."

The following section describes how the mini-FSD frees the RSFT structure so that no "lazy" close operation will occur later.

FS_CLOSE routine:

Clears the pointer to the RSFT in the filesys dependent area of the SFT;

Call FreeRSFT, which frees the memory, unlinks the RSFT from the _RSFT_head chain, and frees the heap memory containing the file name;

FS_CHGFILEPTR routine:

Calculates new offset based on operation requested (from beginning, from end, from current)

If result is negative offset, returns error.

The following section describes how the minifsd saves information for a "lazy" TREE CONNECT SMB to the server.

FS_ATTACH routine:
    Checks input parms.
    Finds corresponding CON_LIST.
    Calls AsgUNC, which finds the CON_LIST and increments counters that will not be used until NETWKSTA.200 is running.
    Sticks CON_LIST pointer in the net drive table.
    Sticks CON_LIST pointer and conn serial number in the volume parameter block structure.
    Stores CON_LIST pointer in current directory (cds) structure.

Having thus described our invention, what we claim as new and desire to secure by letters patent is set forth in the following claims:

We claim:

1. A method for file synchronization during a boot sequence between a client and a server, comprising the steps of:
    during a first phase of the boot sequence, caching file data and information for managing the file data generated by a first file system driver associated with a first file system;
    during a second phase of the boot sequence, having a second file system inherit the file data and information from the first file system driver.

2. The method as described in claim 1 wherein the client is a network computer.

3. The method as described in claim 1 wherein the first file system driver is a mini file system driver.

4. The method as described in claim 3 wherein the second file system is a network file system.

5. The method as described in claim 1 further including the step of unloading the first file system driver during the second phase of the boot sequence.

6. The method as described in claim 1 further including the step of updating the file data after the inherit step.

7. The method as described in claim 1 wherein the file data and information includes data generated by a set of file system commands.

8. The method as described in claim 7 wherein the set of file system commands includes commands selected from the group consisting essentially of read, write, open, close, lock and unlock.

9. A method for file synchronization during downloading of an operating system from a network server to a network computer, comprising the steps of:
    initiating a boot sequence;
    during a first phase of the boot sequence, initializing a mini file system driver associated with a first mini file system;
    caching file data and information for managing the file data generated by the mini file system driver;
    during a second phase of the boot sequence, downloading the operating system; and
    upon initialization of the operating system, having a second file system inherit the file data and information from the mini file system driver.

10. The method as described in claim 9 further including the step of:
    unloading the mini file system driver from system memory upon initializing of the operating system.

11. The method as described in claim 9 further including the step of updating the file data after the inherit step.

12. The method as described in claim 9 wherein the file data and information includes data generated by a set of file system commands.

13. The method as described in claim 12 wherein the set of file system commands includes commands selected from the group consisting essentially of read, write, open, close, lock and unlock.

14. A method for file synchronization in a distributed computing environment, comprising the steps of:
    responsive to a determination that a remote machine having required files is unavailable, caching at a local machine file data needed to manage the required files;
    performing operations for the required files at the local machine to change a state of the required files;
    responsive to the remote machine becoming available, retrieving the cached and state information about the required files; and
    performing the operations for the required files at the remote machine.

15. A computer program product in a computer readable medium for file synchronization during a boot sequence between a client and a server, comprising the steps of:
    means operative during a first phase of the boot sequence for caching file data and information for managing the file data generated by a mini file system driver associated with a first mini file system;
    means operative during a second phase of the boot sequence for controlling a second file system to inherit the file data and information from the mini file system driver.

16. The computer program product as described in claim 15 wherein the mini file system driver supports a limited subset of file system operations.

17. The computer program product as described in claim 16 wherein the second file system is a network file system.

18. The computer program product as described in claim 15 further including means for updating the file data after the second file system inherits the file data and in formation from the mini file system driver.

19. The computer program product as described in claim 15 further including means for saving open file information so that a subsequent lazy file operation can execute in the second file system.

20. The computer program product as described in claim 15 further including means for inhibiting a lazy close operation in the second file system.

21. A file system, comprising:
    a first file system driver associated with a first file system;
    a second file system driver associated with a second file system;
    a cross file system caching and file synchronization mechanism, comprising:
        a cache for storing data files and information for managing the data files generated by the first file system during an initial phase of a boot sequence; and
        means for controlling the second file system to inherit the data files and the information during a subsequent phase of the boot sequence.

* * * * *

UNITED STATES PATENT AND TRADEMARK OFFICE
CERTIFICATE OF CORRECTION

PATENT NO.   : 6,401,093 B1
DATED        : June 4, 2002
INVENTOR(S)  : Anand et al.

It is certified that error appears in the above-identified patent and that said Letters Patent is hereby corrected as shown below:

Column 12,
Line 38, after "and", please delete "in formation" and insert -- information --.

Signed and Sealed this

Thirty-first Day of December, 2002

JAMES E. ROGAN
*Director of the United States Patent and Trademark Office*